US009858553B2

United States Patent
Davis et al.

(10) Patent No.: US 9,858,553 B2
(45) Date of Patent: Jan. 2, 2018

(54) ACH PAYMENT PROCESSING

(71) Applicant: Federal Reserve Bank of Minneapolis, Minneapolis, MN (US)

(72) Inventors: Peter A. Davis, Plymouth, MN (US); Keith Pierce, Lauderdale, MN (US); Stephen P. Hanten, Minneapolis, MN (US); Erik Tennant, Apple Valley, MN (US); Jennifer Larson, Elk River, MN (US)

(73) Assignee: Federal Reserve Bank of Minneapolis, Minneapolis, MN (US)

( * ) Notice: Subject to any disclaimer, the term of this patent is extended or adjusted under 35 U.S.C. 154(b) by 393 days.

(21) Appl. No.: 14/575,291

(22) Filed: Dec. 18, 2014

(65) Prior Publication Data
US 2015/0235186 A1    Aug. 20, 2015

Related U.S. Application Data

(63) Continuation of application No. 12/119,262, filed on May 12, 2008, now abandoned.

(51) Int. Cl.
G06Q 40/00    (2012.01)
G06Q 20/02    (2012.01)
G06Q 20/40    (2012.01)

(52) U.S. Cl.
CPC ......... G06Q 20/023 (2013.01); G06Q 20/401 (2013.01)

(58) Field of Classification Search
None
See application file for complete search history.

(56) References Cited

U.S. PATENT DOCUMENTS 4,270,042 A    5/1981 Case
4,727,243 A    2/1988 Savar
(Continued)

FOREIGN PATENT DOCUMENTS

WO    WO 0030053    5/2000

OTHER PUBLICATIONS

Abraham Silberschatz and Peter B. Galvin, Operating System Concepts, 1994, Addison-Wesley Publishing Company, Inc., Fourth Edition, pp. 111-116.*

(Continued)

Primary Examiner — Scott S Trotter
(74) Attorney, Agent, or Firm — King & Spalding

(57) ABSTRACT

Efficiently processing ACH payments by processing batches of ACH payments in parallel. A processing system of an ACH operator receives an ACH file including multiple batches of ACH items. Each batch includes at least one ACH item. A control module of the processing system organizes data in the ACH file into multiple partitions according to a selected strategy. Each partition includes at least one of the batches. A processing module of the processing system separately processes each partition in parallel, validating the batches and ACH items and creating at least one output batch for each partition. If the control module determines that the ACH file is acceptable, based on this parallel processing, then the processing module settles the ACH items in the output batches and creates at least one new ACH file for transmitting the settled ACH items to one or more corresponding receiving depository financial institutions.

14 Claims, 4 Drawing Sheets

(56) References Cited

U.S. PATENT DOCUMENTS

| | | |
|---|---|---|
| 4,823,264 A | 4/1989 | Deming |
| 5,121,945 A | 6/1992 | Thomas |
| 5,175,682 A | 12/1992 | Higashiyama et al. |
| 5,448,043 A | 9/1995 | Nakano et al. |
| 5,532,464 A | 7/1996 | Josephson et al. |
| 5,691,524 A | 11/1997 | Josephson |
| 5,717,868 A | 2/1998 | James |
| 5,742,819 A | 4/1998 | Caccavale |
| 5,761,510 A | 6/1998 | Smith et al. |
| 5,783,808 A | 7/1998 | Josephson |
| 5,787,402 A | 7/1998 | Potter et al. |
| 5,790,778 A | 8/1998 | Bush et al. |
| 5,794,234 A | 8/1998 | Church et al. |
| 5,825,003 A | 10/1998 | Jennings et al. |
| 5,848,400 A | 12/1998 | Chang |
| 5,852,812 A | 12/1998 | Reeder |
| 5,903,878 A | 5/1999 | Talati et al. |
| 5,940,813 A | 8/1999 | Hutchings |
| 5,946,669 A | 8/1999 | Polk |
| 5,956,700 A | 9/1999 | Landry |
| 5,963,647 A | 10/1999 | Downing et al. |
| 5,963,648 A | 10/1999 | Rosen |
| 5,978,485 A | 11/1999 | Rosen |
| 6,026,379 A | 2/2000 | Haller et al. |
| 6,032,133 A | 2/2000 | Hilt et al. |
| 6,061,665 A | 5/2000 | Bahreman |
| 6,076,064 A | 6/2000 | Rose |
| 6,076,074 A | 6/2000 | Cotton et al. |
| 6,098,053 A | 8/2000 | Slater |
| 6,119,107 A | 9/2000 | Polk |
| 6,141,651 A | 10/2000 | Riley et al. |
| 6,173,272 B1 | 1/2001 | Thomas et al. |
| 6,205,433 B1 | 3/2001 | Boesch et al. |
| 6,216,115 B1 | 4/2001 | Barrameda et al. |
| 6,243,689 B1 | 6/2001 | Norton |
| 6,246,999 B1 | 6/2001 | Riley et al. |
| 6,269,345 B1 | 7/2001 | Riboud |
| 6,304,860 B1 | 10/2001 | Martin, Jr. et al. |
| 6,317,745 B1 | 11/2001 | Thomas et al. |
| 6,408,284 B1 | 6/2002 | Hilt et al. |
| 6,598,028 B1 | 7/2003 | Sullivan et al. |
| 6,615,258 B1 | 9/2003 | Barry |
| 6,629,081 B1 | 9/2003 | Cornelius et al. |
| 6,721,715 B2 | 4/2004 | Nemzow |
| 6,754,640 B2 | 6/2004 | Bozeman |
| 6,829,590 B1 | 12/2004 | Greener et al. |
| 6,856,970 B1 | 2/2005 | Campbell et al. |
| 6,868,408 B1 | 3/2005 | Rosen |
| 6,873,972 B1 | 3/2005 | Marcial et al. |
| 6,892,184 B1 | 5/2005 | Komen |
| 7,004,382 B2 | 2/2006 | Sandru |
| 7,016,876 B1 | 3/2006 | Lanier et al. |
| 7,103,577 B2 | 9/2006 | Blair et al. |
| 7,120,606 B1 | 10/2006 | Ranzini et al. |
| 7,269,575 B1 | 9/2007 | Concannon et al. |
| 7,330,835 B2 | 2/2008 | Deggendorf |
| 7,333,953 B1 | 2/2008 | Banaugh et al. |
| 7,580,886 B1 | 8/2009 | Schulz |
| 7,680,737 B2 | 3/2010 | Smith et al. |
| 2001/0034682 A1 | 10/2001 | Knight et al. |
| 2001/0034702 A1 | 10/2001 | Mockett et al. |
| 2002/0016769 A1 | 2/2002 | Barbara et al. |
| 2002/0029194 A1 | 3/2002 | Lewis et al. |
| 2002/0032642 A1 | 3/2002 | Chichilnisky |
| 2002/0035561 A1 | 3/2002 | Archer et al. |
| 2002/0038305 A1 | 3/2002 | Bahl et al. |
| 2002/0161707 A1 | 3/2002 | Cole |
| 2002/0055904 A1 | 5/2002 | Mon |
| 2002/0072942 A1 | 6/2002 | Kuykendall et al. |
| 2002/0077971 A1 | 6/2002 | Allred |
| 2002/0082962 A1 | 6/2002 | Farris et al. |
| 2002/0087455 A1 | 7/2002 | Tsagarakis et al. |
| 2002/0099656 A1 | 7/2002 | Poh Wong |
| 2002/0120537 A1 | 8/2002 | Morea |
| 2002/0120846 A1 | 8/2002 | Stewart et al. |
| 2002/0161692 A1 | 10/2002 | Loh et al. |
| 2002/0185529 A1 | 12/2002 | Cooper et al. |
| 2003/0018554 A1 | 1/2003 | Lyftogt et al. |
| 2003/0024979 A1 | 2/2003 | Hansen et al. |
| 2003/0033228 A1 | 2/2003 | Bosworth-Davies et al. |
| 2003/0050892 A1 | 3/2003 | Clynes |
| 2003/0055756 A1 | 3/2003 | Allan |
| 2003/0065594 A1 | 4/2003 | Murphy |
| 2003/0065941 A1 | 4/2003 | Ballard |
| 2003/0070080 A1 | 4/2003 | Rosen |
| 2003/0105710 A1 | 6/2003 | Barbara et al. |
| 2003/0126094 A1 | 7/2003 | Fisher et al. |
| 2003/0144942 A1 | 7/2003 | Sobek |
| 2003/0158811 A1 | 8/2003 | Sanders et al. |
| 2003/0167223 A1 | 9/2003 | Pledereder et al. |
| 2003/0167237 A1 | 9/2003 | Degen et al. |
| 2003/0177087 A1 | 9/2003 | Lawrence |
| 2003/0182227 A1 | 9/2003 | Guzman |
| 2003/0187783 A1 | 10/2003 | Arthus et al. |
| 2003/0187792 A1 | 10/2003 | Hansen et al. |
| 2003/0208439 A1 | 11/2003 | Rast |
| 2003/0208440 A1 | 11/2003 | Harada et al. |
| 2003/0208445 A1 | 11/2003 | Campiano |
| 2003/0220878 A1 | 11/2003 | Degen et al. |
| 2003/0229586 A1 | 12/2003 | Repak |
| 2003/0233319 A1 | 12/2003 | Lawrence |
| 2004/0002914 A1 | 1/2004 | Munro |
| 2004/0006533 A1 | 1/2004 | Lawrence |
| 2004/0024709 A1 | 2/2004 | Yu et al. |
| 2004/0030621 A1 | 2/2004 | Cobb |
| 2004/0034594 A1 | 2/2004 | Thomas et al. |
| 2004/0078328 A1 | 4/2004 | Talbert et al. |
| 2004/0078332 A1 | 4/2004 | Ferguson et al. |
| 2004/0083167 A1 | 4/2004 | Kight et al. |
| 2004/0093305 A1 | 5/2004 | Knight et al. |
| 2004/0109596 A1 | 6/2004 | Doran |
| 2004/0117299 A1 | 6/2004 | Algiene et al. |
| 2004/0128240 A1 | 7/2004 | Yusin |
| 2004/0138973 A1 | 7/2004 | Keis et al. |
| 2004/0143621 A1 | 7/2004 | Fredrickson et al. |
| 2004/0148225 A1 | 7/2004 | Beck et al. |
| 2004/0153403 A1 | 8/2004 | Sadre |
| 2004/0199463 A1 | 10/2004 | Deggendorf |
| 2004/0205011 A1 | 10/2004 | Northington et al. |
| 2004/0236646 A1 | 11/2004 | Wu et al. |
| 2005/0004872 A1 | 1/2005 | Gavin et al. |
| 2005/0021454 A1 | 1/2005 | Karpovich et al. |
| 2005/0038743 A1 | 2/2005 | Stanley et al. |
| 2005/0044043 A1 | 2/2005 | Gooding et al. |
| 2005/0086136 A1 | 4/2005 | Love et al. |
| 2005/0167481 A1 | 8/2005 | Hansen et al. |
| 2005/0177464 A1 | 8/2005 | Komen et al. |
| 2005/0209961 A1 | 9/2005 | Michelsen et al. |
| 2006/0206427 A1 | 5/2006 | Love |
| 2009/0157550 A1 | 6/2009 | Fraher et al. |

OTHER PUBLICATIONS

U.S. Appl. No. 60/416,663, Yusin, Oct. 7, 2002.
Abraham Silberschatz and Peter B. Galvin, Operating System Concepts, 1994, Adison-Wesley Publishing Company, Inc., 4$^{th}$ edition, pp. 131-158.
Abraham Silberschatz and Peter B. Galvin, Operating System Concepts, 1994, Adison-Wesley Publishing Company, Inc., 4$^{th}$ edition, pp. 20-23.
Giles Brassard and Paul Bratley, Fundamentals of Algorithimcs, 1996, Prentice-Hall Inc. pp. 376-380.
Daniel, Chris, Partner, Alston & Bird LLP "NACHA Rule Amendments for Third-Part Service Providers: A Case Study" 2004.
Lang, Scott M., "Getting Online to Pay", Jan./Feb. 1997, Financial Executive, ABI/INFORM Global.
Lavery, Timothy A., "Cross-border payments hold promise for expediting international payroll", Mar. 1998, HRMagazine, vol. 43, Issue 4.
Van Natta, D. & O'Brien, T., Flow of Saudis' Cash to Hamas is Scurinized, NY Times, Sep. 17, 2003.

(56) References Cited

OTHER PUBLICATIONS

Clearing House Lets Depositoties Share Fraud Data Steve Bills, American Banker. New York, N.Y.: Oct. 12, 2001. vol. 167, Iss. 196; p. 9.

PC AIMS User's Guide, Credit Controls, pp. 10-1 to 10-8, Feb. 25, 2002.

EPN Voice Response System (RALPH), Applicants submit that this document was published prior to Sep. 30, 2003.

The Impact of NACHA Rule Changes on Third Party Service Providers, Dec. 15, 2004, Deborah Shaw, Senior Director of Network Services, NACHA.

NACHA Third Party ACH Rules: Improving Risk Management for Financial Institutions, Dec. 15, 2004, Mary O'Toole, Vice President, Bank of America.

Homsgaard, Uwe, "Eurogiro, Development of Interface Between FED and Eurogiro", Request for Proposal, Jan. 14, 2003, Eurogiro Network A/S.

"Fixed-to-Fixed Foreign Exchange (F3x) Pilot Overview"; Dec. 18-19, 2006.

"Fixed-to-Fixed Foreign Exchange (F3x) Pilot Overview"; Oct. 25, 2007.

Eurogiro, Development of Interface Between FED and Eurogiro, Request for Proposal, Jan. 14, 2003, Uwe Holmsgaard, Eurogiro Network A/S.

Fedline User Guide, ACH, Version 2.4, Mar. 2002, including Fedline User Guide, Host Communications, Version 2.4, Jun. 1997.

ACH Goes Across the Border, South Florida Banking Institute, Vivki Anderson, Retail Payments Office, Federal Reserve System, Oct. 29, 2001.

William B. Nelson, ACH News from Europe, Payments Journal, Jan./Feb. 2002.

International ACH—Expanding the Gateway Concept Beyond Canada, Vicki Anderson, Retail Payments Office, Federal Reserve System, Apr. 15, 2002.

International Direct Deposit Technical Walkthru, Prepared for IRPPO, Oct. 9, 2002.

FedACH Product Development Discussion, Federal Reserve Financial Services, U.S. Bank, Nov. 30, 2001.

International Direct Deposit Overview, Electronic Payments, EROC, Federal Resrve Bank of New York, Oct. 9, 2002.

Overview of the Federal Reserve System's Check to ACH Conversion (CTAC) Product, Presented Feb. 15, 2002.

Overview, Federal Reserve and Check to ACH Conversion (CTAC), Presented to SWACHA—The Electronic Payments Resource, Jul. 31, 2002.

The Federal Reserve & Check-to-ACH Conversion, NACHA Electronic Check Conference, Sep. 23-24, 2002, Terry Roth, Retail Payments Office of the Federal Reserve System.

2002 ACH Rules, A Complete Guide to Rules & Regulations Governing the ACH Network, National Automated Clearing House Association, Copyright 2002. Attached pages: 1) Understanding the ACH Network: An ACH Primer, pp. 1-17; 2) Operating Rules of the National Automated Clearing House Association, Article Eight, pp. 28-29; 3) Operating Guidelines of the National Automated Clearing House Association: Section II, Chapter III, pp. 40-45; and Section IV, Chapter VI, pp. 120-140; and 4) Federal Reserve Bank Uniform Operating Circular {No. 4} on Automated Clearing House Items, Jun. 25, 2001.

The Impact of NACHA Rule Amendment for Third Party Service Providers, Dec. 15, 2004, Deborah Shaw, Senior Director of Network Services, NACHA.

SEI Investments Utilizes CheckFree RECON Securities to Automate Reconciliation Processes PR Newswire, New York: Jun. 24, 2002; p. 1.

Bills, Steve; Clearing House Lets Depositories Share Fraud Data; American Banker; New York, N.Y.; Oct 12, 2001; vol. 167, Iss. 196; p. 9.

Kingston, Jennifer A.; Twi Players Retrenching, Visa Quits Processing; Dec. 3, 2002; American Banker; v167n230, p. 1.

Fed Extending ACH Services to 6 Nations; Mar. 7, 2003; American Banker; v168n45, p. 1.

McClelland, Kelly R.; International ACH: Best Kept Secret for Low Cost Payments; Mar./Apr. 2004; AFP Exchange; v24n2; pp. 44+.

\* cited by examiner

ACH PAYMENT PROCESSING

CROSS REFERENCE TO RELATED APPLICATION

This application is a continuation of U.S. patent application Ser. No. 12/119,262, filed May 12, 2008, the entire content of which is hereby fully incorporated herein by reference.

TECHNICAL FIELD

The invention relates generally to processing payments in an Automated Clearinghouse ("ACH"), and more particularly to efficiently processing ACH payments by processing batches of ACH payments in parallel.

BACKGROUND

Financial institutions are increasingly clearing financial transactions using electronic systems such as the Automated Clearinghouse ("ACH") network. The ACH network is a nationwide electronic funds transfer system supported by several operators, including the Federal Reserve Banks and other institutions. The ACH network is governed by a set of rules administered by the National Automated Clearinghouse Association ("NACHA"). ACH offers financial institutions, companies, consumers, and others an efficient alternative to paper based payment methods.

In ACH, an originator sends electronic transaction items to an originating depository financial institution ("ODFI"). The originator is a person or organization that agrees to initiate ACH payments in the ACH network according to an arrangement with another, receiving person or entity (a "receiver"). For example, the originator can be a company that agrees to originate an ACH payment to an account of a consumer.

The ODFI packages the transaction items in one or more batched ACH files, according to the NACHA rules. The ODFI transmits the ACH files to an ACH operator. The ODFI may send the ACH files to the ACH operator directly or via a third party or "remote" sending point. The third party or remote sending point may be a depository financial institution or a company providing processing services for a depository financial institution. The term "ACH file" is used herein to refer to any collection of batched and/or unbatched ACH transaction items.

The ACH operator is a Federal Reserve Bank or other entity that receives ACH files from an ODFI and distributes transaction items within the ACH files to at least one corresponding receiving depository financial institution ("RDFI") associated with a receiver. In some cases, the ACH operator also may perform settlement functions (crediting and debiting of accounts) for the affected financial institutions.

Each ACH file includes at least one batch of transaction items. Each batch includes one or more transaction items. The terms "transaction item" and "ACH item" are used interchangeably herein to refer to any batched electronic payment or payment instruction, whether international or domestic, and/or information associated with a batched electronic payment or payment instruction. For example, a payment or payment instruction can be a credit, a debit, or a rejected or returned transaction.

Upon receiving an ACH file, processors of the ACH operator sort, batch, and re-assemble the transaction items in the ACH file in at least one new ACH file for delivery to one or more RDFI's. The RDFI's may receive the ACH files directly or via one or more third party or "remote" receiving points. Each third party or remote receiving point may be a depository financial institution or a company providing processing services for a depository financial institution. The RDFI's forward the transaction items in the ACH files to their corresponding receivers. Each receiver is a person or organization that has authorized an originator to initiate an ACH payment to an account of the receiver, at the receiver's RDFI.

Traditionally, ACH operators include multiple mainframe processors, which process ACH files, file by file, on a first in, first out basis. Each ACH file is processed by a single one of the mainframe processors. Because each ACH file can include a varying number of batches with a varying number of transaction items, each mainframe processor can bear a different processing load. For example, one mainframe processor may process an ACH file with only a single transaction item, while another mainframe processor may process an ACH file with multiple batches including large amounts of transaction items. Thus, at least some mainframe processors may be over-loaded or under-loaded. This results in many processing inefficiencies, including ineffective use of the under-loaded mainframe processors and delays in processing of transaction items handled by the over-loaded mainframe processors.

Therefore, a need exists in the art for a system and method for efficiently processing ACH payments.

SUMMARY

The invention provides systems and methods for processing ACH payments. In particular, the invention provides systems and methods for efficiently processing ACH payments by processing batches of ACH payments in parallel.

An ACH processing system of an ACH operator receives an ACH file including multiple batches of ACH items. For example, the ACH processing system can receive the ACH file from an ODFI or an operator acting on behalf of an ODFI. Each batch of the ACH file includes at least one ACH item.

A control module of the ACH processing system organizes data in the ACH file into multiple partitions according to a selected strategy. Each partition includes at least one of the batches. For example, the control module can select a strategy that assigns (a) a fixed number of the batches to each partition, (b) a substantially equal number of batches to each partition, or (c) a substantially equal number of ACH items to each partition. Other strategies for organizing batched data are well known to a person of ordinary skill in the art having the benefit of the present disclosure.

A processing module of the ACH processing system separately processes each partition in parallel. For example, each of multiple processors associated with the processing module can process at least one of the partitions. Alternatively, multiple of the partitions may be processed on the same processor using application threading. For example, the processing module can utilize one or more java objects, such as IBM WebSphere Application Server's "asynchronous beans" running on a Java 2 Platform Enterprise Edition ("J2EE") application, to perform the application threading. The processing module can modify threading parameters in the J2EE application to ensure that each processor is not over-loaded or under-loaded during processing.

During processing, the processing module validates the batches and ACH items and creates at least one output batch for each partition. Each output batch includes information regarding at least one of the ACH items. For example, a particular output batch can include multiple ACH items associated with the same ODFI and/or RDFI. The processing module also may store settlement information for each ACH item.

The output batches can include ACH items that were successfully validated during processing or ACH items that were not successfully validated during processing. For example, "risk pended" output batches can include information regarding ACH items that were not successfully validated during processing, and non-risk pended output batches can include information regarding ACH items that were successfully validated during processing.

The control module evaluates the validation results for each partition to determine whether the ACH file is acceptable. If the control module determines that the ACH file is not acceptable, then the ACH operator may return the ACH file to the ODFI, suspend processing of the ACH file, and/or output a notification advising the ODFI and/or an operator of the ACH processing system that the ACH file will not be processed. If the control module determines that the ACH file is acceptable, then the processing module determines whether each output batch is a risk pended output batch or a non-risk pended output batch. The processing module settles the ACH items in the non-risk pended output batches and creates at least one new ACH file for transmitting the settled ACH items to at least one corresponding RDFI.

The processing module determines whether each risk pended output batch is acceptable for transmission to an RDFI. For example, the processing module can make that determination based on information from one or more operators of the ACH processing system and/or the ODFI. If the processing module determines that a particular risk pended output batch is not acceptable for transmission to an RDFI, then the ACH operator may return the output batch and/or the ACH items contained therein to the ODFI, suspend processing of the output batch and/or ACH items, and/or output a notification advising the ODFI and/or an operator of the ACH processing system that the output batch and/or ACH items will not be processed. If the processing module determines that the risk pended output batch is acceptable for transmission to an RDFI, then the processing module settles the ACH items in the risk pended output batch and creates at least one new ACH file for transmitting the settled ACH items to at least one corresponding RDFI.

Additional aspects, features, and advantages of the invention will become apparent to those skilled in the art upon consideration of the following detailed description of illustrated embodiments exemplifying the best mode of carrying out the invention as presently perceived.

DETAILED DESCRIPTION OF EXEMPLARY EMBODIMENTS

The invention is directed to systems and methods for efficiently processing ACH payments. In particular, the invention is directed to systems and methods for efficiently processing ACH files by processing batches of ACH payments in parallel.

The invention includes a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Turning now to the drawings, in which like numerals indicate like elements throughout the figures, exemplary embodiments of the invention are described in detail.

Figure 1:
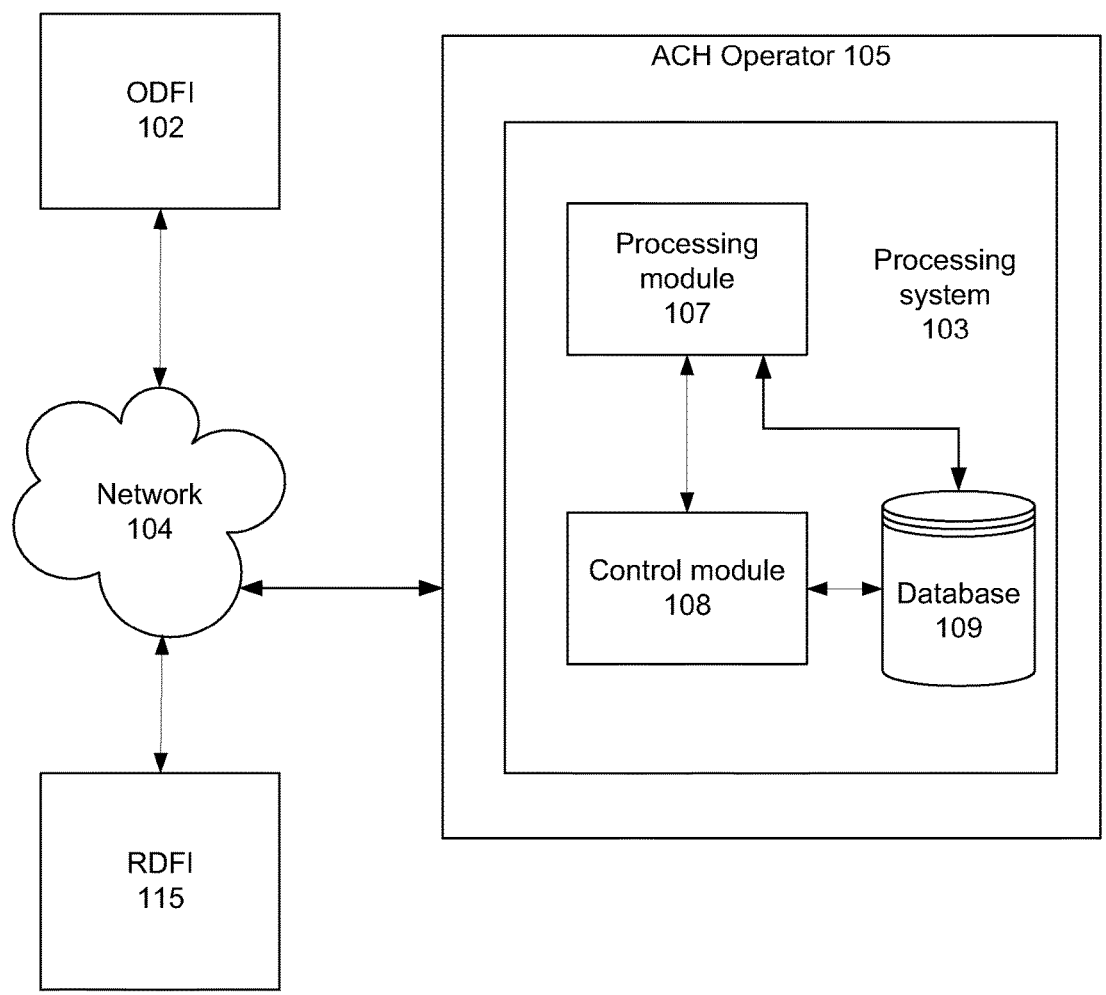
FIG. 1 is a block diagram depicting a system for efficiently processing an ACH file, in accordance with certain exemplary embodiments.

FIG. 1 is a block diagram depicting a system 100 for efficiently processing an ACH file, in accordance with certain exemplary embodiments. The system 100 is described below with reference to the methods illustrated in FIGS. 2-4.

Figure 2:
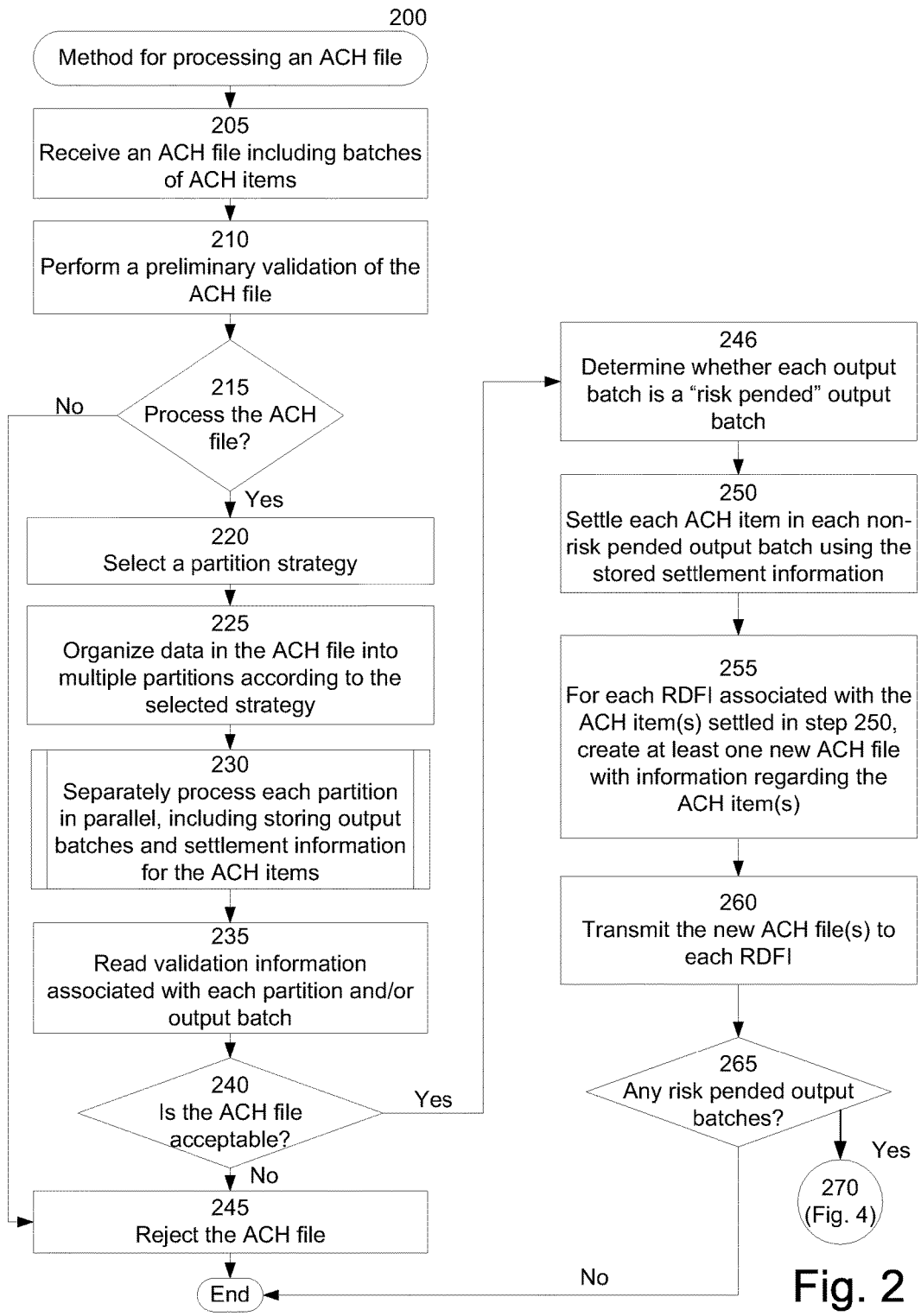
FIG. 2 is a flow chart depicting a method for efficiently processing an ACH file, in accordance with certain exemplary embodiments.

FIG. 2 is a flow chart depicting a method 200 for efficiently processing an ACH file, in accordance with certain exemplary embodiments. The exemplary method 200 is illustrative and, in alternative embodiments of the invention, certain steps can be performed in a different order, in parallel with one another, or omitted entirely, and/or certain additional steps can be performed without departing from the scope and spirit of the invention. The method 200 is described below with reference to FIGS. 1 and 2.

In step 205, an ACH operator 105 receives an ACH file including multiple batches of ACH items. The ACH operator 105 is a Federal Reserve Bank or other entity that receives an ACH file from an originating depository financial institution 102 ("ODFI") and distributes transaction items within the ACH file to at least one corresponding receiving depository financial institution 115 ("RDFI"). In some cases, the ACH operator 105 also may perform settlement functions (crediting and debiting of accounts) for the affected financial institutions 102, 115.

In certain alternative exemplary embodiments, the ACH operator 105 can receive the ACH file from a third party or "remote" sending point (not shown) operating on behalf of the ODFI 102. The third party or remote sending point may be a depository financial institution or a company providing processing services for a depository financial institution. The term "ACH file" is used herein to refer to any collection of batched and/or unbatched ACH items.

In certain exemplary embodiments, the ACH operator 105 can receive the ACH file via a network 104. The network 104 can include any wired or wireless telecommunication means by which computerized devices can exchange data, including for example, a local area network (LAN), a wide area network (WAN), an intranet, an Internet, or any combination thereof. For example, the network 104 can include the ACH network.

Each batch of the received ACH file includes one or more transaction items. The terms "transaction item" and "ACH item" are used interchangeably herein to refer to any batched electronic payment or payment instruction, whether international or domestic, and/or information associated with a batched electronic payment or payment instruction. For example, a payment or payment instruction can be a credit, a debit, or a rejected or returned transaction.

In step 210, a processing module 107 of a processing system 103 operated by the ACH operator 105 performs a preliminary validation of the ACH file. For example, the processing module 107 can determine whether the file is properly formatted and/or includes suitable information for processing. In certain exemplary embodiments, the processing module 107 can perform this preliminary validation based on one or more rules stored in a database 109 of the processing system 103.

In step 215, the processing module 107 determines whether to process the ACH file. For example, the processing module 107 can determine to process the ACH file if the ACH file is successfully validated in step 210. Similarly, the processing module 107 can determine to not process the ACH file if the ACH file is not successfully validated in step 210.

If the processing module 107 determines in step 215 to not process the ACH file, then the method 200 branches to step 245, which is discussed below. If the processing module 107 determines in step 215 to process the ACH file, then the method 200 continues to step 220.

In step 220, a control module 108 of the processing system 103 selects a partition strategy. The partition strategy is a schema for dividing information within the ACH file into multiple partitions. Each partition includes one or more of the batches of the ACH file.

For example, one partition strategy can be to assign a fixed number of batches to each partition. A second partition strategy can be to assign substantially equal numbers of batches to each of the partitions. A third partition strategy can be to assign batches to the partitions so that each partition includes a substantially equal number of ACH items. A person of ordinary skill in the art having the benefit of the present disclosure will recognize that many other strategies exist for partitioning batches of data.

In step 225, the control module 108 organizes the data in the ACH file into multiple partitions according to the strategy selected in step 220. In step 230, the processing module 107 separately processes each partition in parallel. For example, each of multiple processors (not shown) associated with the processing module 107 can process at least one of the partitions. Alternatively, multiple of the partitions may be processed on the same processor using application threading. For example, in certain exemplary embodiments, the processing module 107 can utilize one or more java objects, such as asynchronous beans running on a Java 2 Platform Enterprise Edition ("J2EE") application, to perform the application threading. In certain exemplary embodiments, the processing module 107 can modify threading parameters in the J2EE application to ensure that each processor is not over-loaded or under-loaded during processing.

During processing, the processing module 107 validates each batch and ACH item and creates and stores output batches and settlement information for the ACH items. For example, the processing module 107 can store the output batches and settlement information in the database 109. Each output batch includes one or more ACH items. For example, all the ACH items in a particular output batch can be associated with the same RDFI 115 and/or ODFI 102. The processing module 107 can use the output batches and settlement information to complete the processing of the ACH items, as described below. In certain exemplary embodiments, the processing module 107 can store validation information, such as validation results, for each batch and ACH item in the database 109 of the processing system 103. Step 230 is described in more detail below, with reference to FIG. 3.

In step 235, the control module 108 reads validation information associated with each partition. For example, the control module 108 can read the validation information from the database 109 of the processing system 103. In step 240, the control module 108 determines whether the ACH file is acceptable, based on the validation information read in step 235. For example, the control module 108 may determine that an ACH file is not acceptable if a large quantity of validation errors were identified in step 235. The control module 108 also may determine that an ACH file is not acceptable if one or more significant validation errors were identified in step 235. In certain exemplary embodiments, the processing module 107 can make the decision of step 240 based on one or more rules stored in the database 109. In some cases, the control module 108 may determine that an ACH file is not acceptable even if the ACH file successfully completed the preliminary validation of step 215.

If the control module 108 determines in step 240 that the ACH file is not acceptable, then the method 200 branches to step 245. In step 245, the control module 108 rejects the ACH file for further processing. For example, the control module 108 can return the ACH file to the ODFI 102 via the network 104, suspend processing of the ACH file, and/or output a notification advising the ODFI 102 and/or an operator of the ACH processing system 103 that the ACH file will not be processed. In certain exemplary embodiments, the ODFI 102 and/or operator can override the rejection decision if it determines that the ACH file actually should be processed.

If the control module 108 determines in step 240 that the ACH file is acceptable, then the method 200 continues to step 246. In step 246, the processing module 107 determines whether each output batch (stored in step 230) is a "risk pended" output batch or a non-risk pended output batch. A risk pended output batch is an electronic file or record that includes information regarding at least one ACH item that was not successfully validated (in step 230). Similarly, a non-risk pended output batch is an electronic file or record that includes information regarding at least one ACH item that has been successfully validated (in step 230). In certain exemplary embodiments, a "flag" or indicator within, or associated with, a particular output batch can indicate whether the output batch is a risk pended output batch or a non-risk pended output batch.

In step 250, the processing module 107 settles each ACH item in the non-risk pended output batches using the settlement information stored in step 230. For example, the processing module 107 can cause accounts associated with the ODFI 102 and RDFI 115 associated with each ACH item to be credited and/or debited in accordance with the settlement information.

In step 255, the processing module 107 creates at least one new ACH file. Each ACH file includes information regarding at least one of the ACH items settled in step 250. For example, each ACH file can include one or more of the non-risk pended output batches.

In certain exemplary embodiments, the processing module 107 can create at least one new ACH file for each RDFI 115. Each ACH file for a particular RDFI 115 can include one or more batches of ACH items associated with the RDFI 115. In step 260, the processing module 107 transmits each new ACH file to its corresponding RDFI 115. For example, the processing module 107 can transmit the new ACH file(s) via the network 104.

In step 265, the processing module 107 determines whether any risk pended output batches were identified in step 246. If so, then the method 200 branches to step 270, which is described below with reference to FIG. 4. If the processing module 107 determines that there were not any risk pended output batches identified in step 246, then the method 200 ends.

Figure 3:
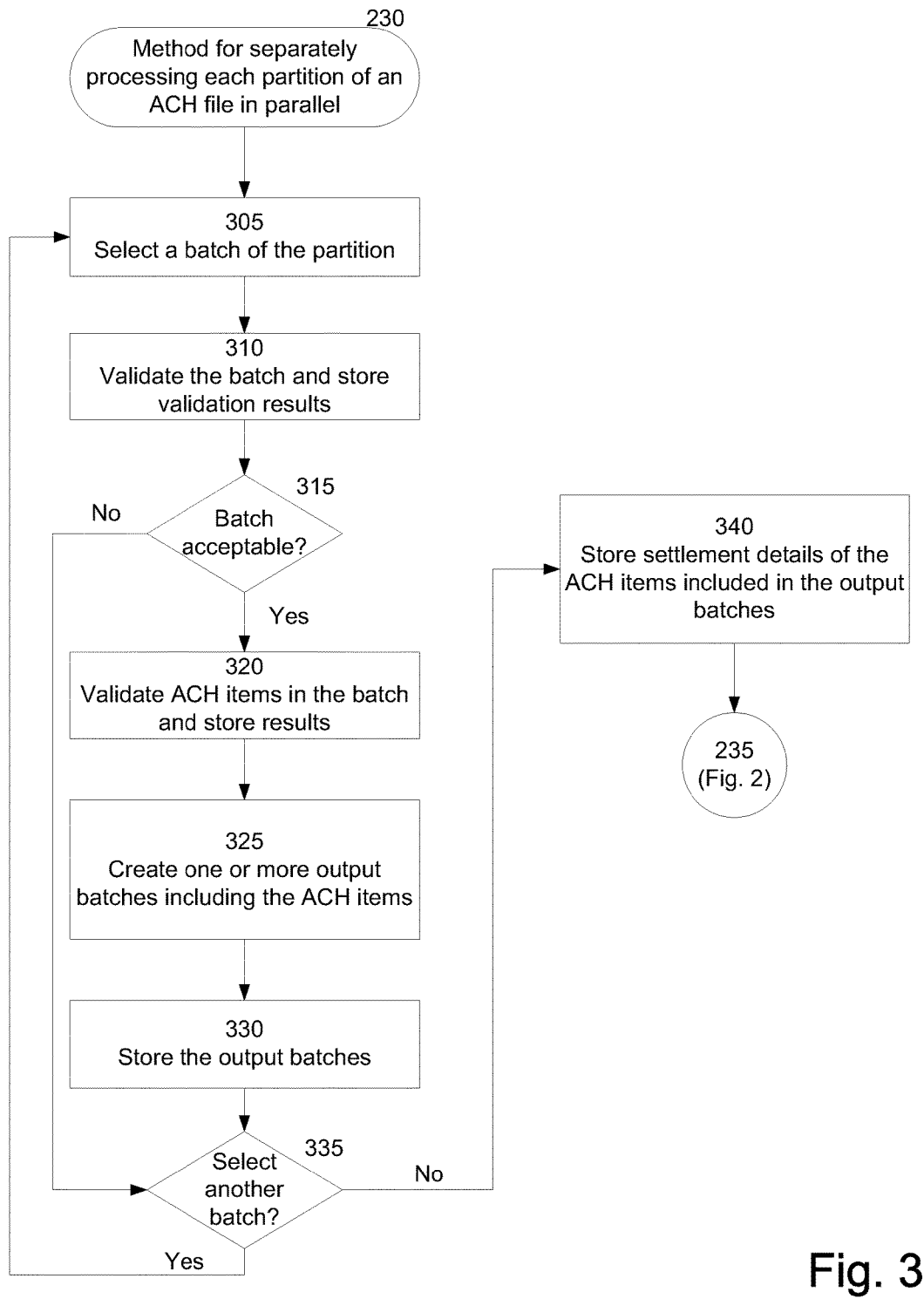
FIG. 3 is a flow chart depicting a method for separately processing partitions of an ACH file in parallel, in accordance with certain exemplary embodiments.

FIG. 3 is a flow chart depicting a method 230 for separately processing partitions of an ACH file in parallel, in accordance with certain exemplary embodiments, as referred to in step 230 of FIG. 2. The exemplary method 230 is illustrative and, in alternative embodiments of the invention, certain steps can be performed in a different order, in parallel with one another, or omitted entirely, and/or certain additional steps can be performed without departing from the scope and spirit of the invention. The method 230 is described below with reference to FIGS. 1-3.

The processing module 107 typically performs multiple instances of the method 230 in parallel, with each instance being associated with a different one of the partitions of the ACH file. In step 305, the processing module 107 selects a batch of the partition. In step 310, the processing module 107 validates the batch and stores validation results in the database 109. For example, the processing module 107 can validate the batch by determining whether the batch is properly formatted and/or includes suitable information for processing. In certain exemplary embodiments, the processing module 107 can perform this validation based on one or more rules stored in the database 109. For example, the stored validation results can include information regarding any validation errors identified during validation and/or information indicating that the batch was successfully validated, if appropriate.

In step 315, the processing module 107 determines whether the batch is acceptable, based on the validation performed in step 310. In certain exemplary embodiments, the processing module 107 can make the decision of step 315 based on one or more rules stored in the database 109. If the processing module 107 determines in step 315 that the batch is not acceptable, then the method 230 branches to step 330, which is discussed below.

If the processing module 107 determines in step 315 that the batch is acceptable, then the method 230 continues to step 320. In step 320, the processing module 107 validates ACH items in the batch and stores validation results in the database 109. For example, the processing module 107 can validate each ACH item by determining whether the ACH item is properly formatted and/or includes suitable information for processing. In certain exemplary embodiments, the processing module 107 can perform this validation based on one or more rules stored in the database 109. For example, the stored validation results can include information regarding any validation errors identified during validation and/or information identifying each successfully validated ACH item.

In step 325, the processing module 107 creates one or more output batches. Each output batch is an electronic file or record that includes information regarding at least one ACH item of the partition. For example, all the ACH items in a particular output batch can be associated with the same RDFI 115 and/or ODFI 102.

In certain exemplary embodiments, the processing module 107 can create "risk pended" and "non-risk pended" output batches. A risk pended output batch is an electronic file or record that includes information regarding at least one ACH item that was not successfully validated. Similarly, a non-risk pended output batch is an electronic file or record that includes information regarding at least one ACH item that has been successfully validated. In certain exemplary embodiments, a "flag" or indicator within, or associated with, a particular output batch can indicate whether the output batch is a risk pended output batch or a non-risk pended output batch.

In step 330, the processing module 107 stores the output batches in the database 109. In step 335, the processing module 107 determines whether to select another batch. If so, then the method 230 branches back to step 305 to repeat steps 305-330 for another batch. If the processing module 107 determines in step 335 to not select another batch, then the method 230 continues to step 340.

In step 340, the processing module 107 stores settlement information for each of the output batches in the database 109. For example, the settlement information may include information useful in settling payment of each ACH item included in the output batches, such as an aggregate credit or debit amount for each ODFI 102 and/or RDFI 115, a credit or debit amount for each ACH item, an American Bankers Association ("ABA") number associated with each ODFI 102, and/or an ABA number associated with each RDFI 115. The method 230 continues to step 235 of FIG. 2, discussed above.

Figure 4:
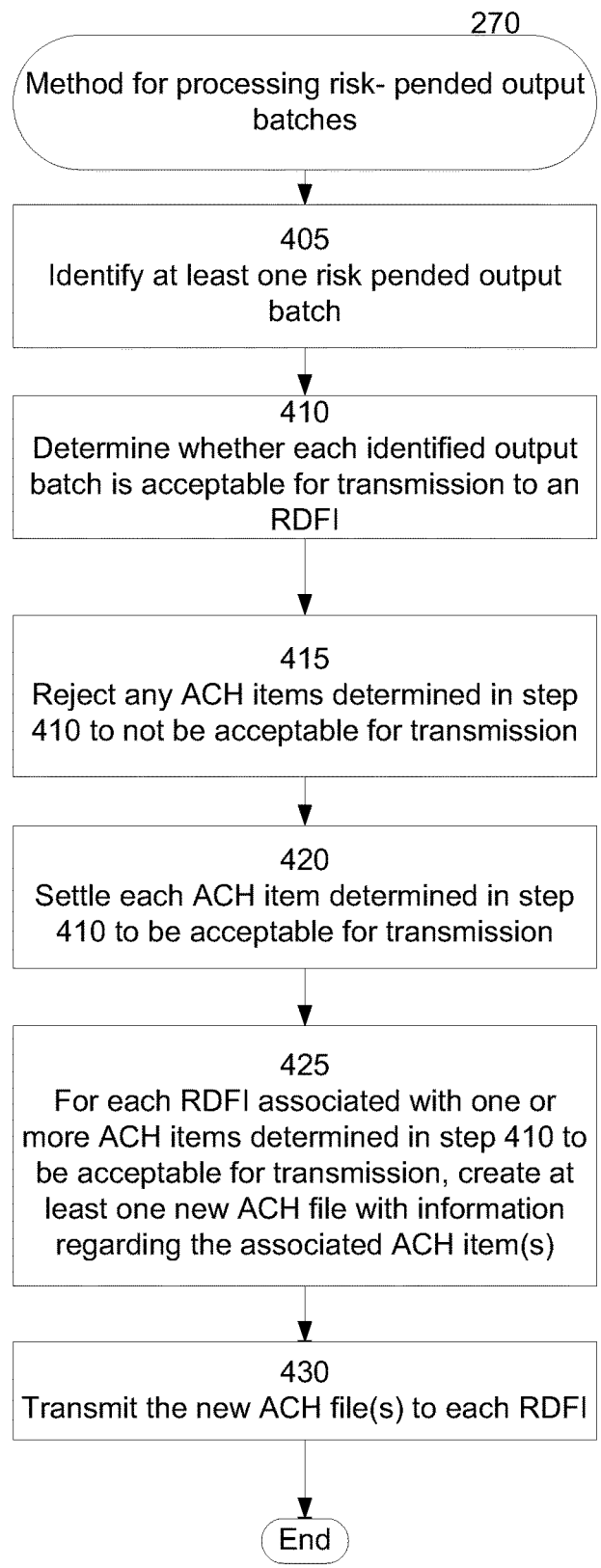
FIG. 4 is a flow chart depicting a method for processing risk pended output batches, in accordance with certain exemplary embodiments.

FIG. 4 is a flow chart depicting a method 270 for processing risk pended output batches, in accordance with certain exemplary embodiments, as referred to in step 270 of FIG. 2. The exemplary method 270 is illustrative and, in alternative embodiments of the invention, certain steps can be performed in a different order, in parallel with one another, or omitted entirely, and/or certain additional steps can be performed without departing from the scope and spirit of the invention. The method 270 is described below with reference to FIGS. 1-4.

In step 405, the processing module identifies at least one risk pended output batch. In step 410, the processing module determines whether each identified risk pended output batch risk is acceptable for transmission to an RDFI 115. In certain exemplary embodiments, the processing module 107 can make that determination based on information from one or more operators of the ACH processing system 103 and/or the ODFI 102. For example, the processing module 107 can transmit at least a portion of each risk pended output batch to its corresponding ODFI 102 for review, via the network 104. The operator(s) of the ODFI 102 and/or ACH processing system 103 can evaluate whether each risk pended output batch is suitable for transmission to the RDFI 115 based on one or more rules. For example, the rules may include certain formatting and/or content requirements for each batch and/or ACH item therein. The rules may be the same or different from rules used in validating the ACH file, partitions, and ACH items in steps 210 and 230 of FIG. 2. In certain exemplary embodiments, the rules can be stored in a database, such as the database 109.

In step 415, the processing module 107 rejects any risk pended ACH items determined in step 410 to not be acceptable for transmission. For example, the processing module 107 can return each rejected output and/or the ACH items contained therein to its corresponding ODFI 102, suspend processing of the output batch and/or ACH items, and/or output a notification advising the ODFI 102 and/or an operator of the ACH processing system 103 that the output batch and/or ACH items will not be processed.

In step 420, the processing module 107 settles each ACH item in each risk pended output batch, if any, determined in step 410 to be acceptable for transmission. For example, the processing module 107 can cause accounts associated with the ODFI 102 and RDFI 115 of each ACH item to be credited and/or debited in accordance with information in the ACH item. Similar to step 255 of FIG. 2, in step 425, the processing module 107 creates at least one new ACH file for each RDFI 115 associated with one or more of the ACH items settled in step 420. Each new ACH file for a particular RDFI 115 includes one or more batches of acceptable ACH items associated with the RDFI 115. In step 430, the processing module 107 transmits each new ACH file to its corresponding RDFI 115. For example, the processing module 107 can transmit the new ACH file(s) via the network 104.

It will be appreciated that the exemplary embodiments of the invention overcome the limitations of the prior art. From the description of the exemplary embodiments, equivalents of the elements shown therein and ways of constructing other embodiments of the invention will be apparent to practitioners of the art. Many other modifications, features and embodiments of the invention will become evident to those of skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes can be made therein without departing from the spirit and scope of the invention.

We claim:

1. A computer-implemented method for processing automated clearinghouse ("ACH") payments, comprising the steps of:
    receiving an ACH file comprising a plurality of batches from an originating institution, at least one of the batches comprising at least two ACH items;
    validating the ACH file to determine if the ACH file is in condition for processing;
    responsive to validating the ACH file and determining that a result of the validation is negative, returning the ACH file to an originating depository financial institution;
    responsive to validating the ACH file and determining that the result of the validation is positive, selecting, by a control module, a partition strategy from a plurality of partition strategies according to at least one of a number of the plurality of batches in the ACH file and a number of ACH items in each of the plurality of batches, wherein the partition strategy comprises one of assigning a fixed number of the batches to each of the partitions, assigning a substantially equal number of batches to each of the partitions, and assigning a substantially equal number of ACH items to each of the partitions;
    responsive to selecting the partition strategy, organizing, by the control module, the plurality of batches of the ACH file into one or more partitions based on the selected partition strategy, each partition comprising at least one batch;
    using a threading application, determining, by a processing module, a number of partitions that are to be processed by each processor of an ACH operator;
    separately processing the one or more partitions in parallel using the threading application to generate a plurality of new batches, each of the plurality of new batches being associated with a same receiving institution and the plurality of new batches comprising a first batch comprising only successfully validated ACH items and a second batch comprising at least one unsuccessfully validated ACH item,
    modifying one or more threading parameters associated with the threading application to ensure that the processor of the ACH operator is not over-loaded or under-loaded;
    settling payment for each ACH item in the first batch;
    determining that (a) a first ACH item in the second batch should be settled for payment, and (b) a second ACH item in the second batch should not be settled for payment; and
    in response to the determining step, settling payment for the first ACH item in the second batch but not for the second ACH item in the second batch,
        wherein the control module and processing module are implemented in at least one computer system that comprises instructions stored in a machine-readable medium and a processor that executes the instructions.

2. The computer-implemented method of claim 1, wherein the step of separately processing each partition in parallel comprises the step of storing one or more new batches of the plurality of new batches for each partition.

3. The computer-implemented method of claim 1, wherein the step of separately processing each partition in parallel comprises the step of storing settlement information for each partition.

4. The computer-implemented method of claim 1, wherein the step of separately processing each partition in parallel comprises the steps of:
    for each partition,
        determining whether each ACH item of the partition is suitable for processing; and
        creating at least one new batch in response to determining that any ACH item of the partition is suitable for processing, each new batch comprising at least one ACH item.

5. A system for processing automated clearinghouse ("ACH") payments, wherein the system comprises:
    a computer network; and
    an ACH operator communicatively coupled to the computer network, wherein the ACH operator is configured to:
        receive an ACH file comprising a plurality of batches from an originating institution, at least one of the batches comprising at least two ACH items;
        responsive to validating the ACH file and determining that a result associated with the validation is positive, select a partition strategy for organizing the plurality of batches in the ACH file into one or more partitions, wherein the partition strategy is selected from a plurality of partition strategies according to at least one of a number of the plurality of batches in the ACH file and a number of ACH items in each of the plurality of batches, and wherein the partition strategy comprises one of assigning a fixed number of the batches to each of the partitions, assigning a substantially equal number of batches to each of the partitions, and assigning a substantially equal number of ACH items to each of the partitions;
responsive to selecting the partition strategy, organize the plurality of batches in the ACH file into one or more partitions based on the selected partition strategy;
determine, using a threading application, a number of partitions that are to be processed by each processor of the ACH operator;
separately process the one or more partitions in parallel using the threading application to generate a plurality of new batches, each of the plurality of new batches being associated with a same receiving institution and the plurality of new batches comprises a first batch comprising only successfully validated ACH items and a second batch comprising at least one unsuccessfully validated ACH item;
modify one or more threading parameters associated with the threading application to ensure that the processor of the ACH operator is not over-loaded or under-loaded;
settle payment for each ACH item in the first batch;
determine that (a) a first ACH item in the second batch should be settled for payment, and (b) a second ACH item in the second batch should not be settled for payment; and
in response to the determining step, settle payment for the first ACH item in the second batch but not for the second ACH item in the second batch.

6. The system of claim 5, wherein the ACH operator is configured to store one or more of the plurality of new batches for each partition.

7. The system of claim 5, wherein the ACH operator is configured to:
for each partition,
determine whether each ACH item of the partition is suitable for processing; and
create at least one new batch in response to determining that any ACH item of the partition is suitable for processing.

8. The system of claim 5, wherein the ACH operator is configured to:
create at least one new ACH file comprising the first ACH item of the second batch but not the second ACH item of the second batch.

9. The system of claim 5, wherein the ACH operator is configured to:
creating at least one new ACH file comprising the first ACH item of the second batch but not the second ACH item of the second batch.

10. The system of claim 5, wherein the ACH operator is configured to:
identify whether each of the plurality of new batches includes a risk indicator, wherein the payment for each ACH item in the first batch is settled based on identifying that the first batch does not include the risk indicator.

11. A system for processing automated clearinghouse ("ACH") payments, comprising:
an originating institution that transmits an ACH file comprising a plurality of batches, at least one of the batches comprising at least two ACH items; and
an ACH operator that receives the ACH file and comprises a processing module that is coupled to a control module, wherein the processing module being configured to:
responsive to validating the ACH file and determining that the validation result is positive, select a partition strategy from a plurality of partition strategies according to at least one of a number of the plurality of batches in the ACH file and a number of ACH items in each of the plurality of batches, wherein the partition strategy comprises one of assigning a fixed number of the batches to each of the partitions, assigning a substantially equal number of batches to each of the partitions, and assigning a substantially equal number of ACH items to each of the partitions;
responsive to selecting the partition strategy, organize each of the plurality of batches in the ACH file into one or more partitions based on the selected partition strategy, each partition comprising at least one of the batches;
determine, using a threading application, a number of partitions that are to be processed by a processor;
separately process the one or more partitions in parallel using the threading application to generate a plurality of new batches, each of the plurality of new batches being associated with a same receiving institution and the plurality of new batches comprising a first batch comprising only successfully validated ACH items and a second batch comprising at least one unsuccessfully validated ACH item; and
modify one or more threading parameters associated with the threading application to ensure that the processor of the ACH operator is not over-loaded or under-loaded.

12. The system of claim 11, wherein the processing module is configured to:
settle payment for each ACH item in the first batch;
determine that (a) a first ACH item in the second batch should be settled for payment, and (b) a second ACH item in the second batch should not be settled for payment; and
in response to the determining step, settle payment for the first ACH item in the second batch but not for the second ACH item in the second batch.

13. The system of claim 11, wherein the processing module is configured to store settlement information for each partition.

14. The system of claim 11, wherein the processing module is configured to:
for each partition,
determine whether each ACH item of the partition is suitable for processing; and
create at least one new batch in response to determining that any ACH item of the partition is suitable for processing.

* * * * *